(12) United States Patent
Joseph

(10) Patent No.: US 6,883,709 B2
(45) Date of Patent: Apr. 26, 2005

(54) BIOMETRIC IDENTIFICATION AND SECURITY SYSTEM ASSOCIATED WITH CASH REGISTER

(75) Inventor: Joseph Joseph, Brooklyn, NY (US)

(73) Assignee: Famous Horse, Inc., Brooklyn, NY (US)

( * ) Notice: Subject to any disclaimer, the term of this patent is extended or adjusted under 35 U.S.C. 154(b) by 134 days.

(21) Appl. No.: 10/074,636

(22) Filed: Feb. 12, 2002

(65) Prior Publication Data

US 2003/0150911 A1 Aug. 14, 2003

(51) Int. Cl.[7] .............................. G06F 7/08; G06K 19/06
(52) U.S. Cl. ...................... 235/381; 235/491; 235/492
(58) Field of Search .................................. 235/381, 491, 235/492, 375, 380, 383, 382, 379, 332.5; 705/33, 2, 14, 35, 10

(56) References Cited

U.S. PATENT DOCUMENTS

| | | | |
|---|---|---|---|
| 3,576,538 A | | 4/1971 | Miller |
| 4,690,554 A | | 9/1987 | Froelich |
| 5,073,949 A | | 12/1991 | Takeda et al. |
| 5,484,988 A | * | 1/1996 | Hills et al. ................... 235/379 |
| 5,615,277 A | | 3/1997 | Hoffman |
| 6,002,785 A | | 12/1999 | Ucida |
| 6,028,950 A | | 2/2000 | Merjanian |
| 6,148,094 A | | 11/2000 | Kinsella |
| 6,185,318 B1 | | 2/2001 | Jain et al. |
| 6,192,142 B1 | | 2/2001 | Pare, Jr. et al. |
| 6,208,264 B1 | | 3/2001 | Bradney et al. |
| 6,219,439 B1 | | 4/2001 | Burger |
| 6,241,288 B1 | | 6/2001 | Bergenek et al. |
| 6,522,772 B1 | * | 2/2003 | Morrison et al. ........... 382/124 |
| 2001/0018660 A1 | * | 8/2001 | Sehr .............................. 705/5 |
| 2002/0112177 A1 | * | 8/2002 | Voltmer et al. ............. 713/200 |

* cited by examiner

Primary Examiner—Thien M. Le
(74) Attorney, Agent, or Firm—Stephen E. Feldman, P.C.

(57) ABSTRACT

A wholesale and/or retail check out station system includes a biometric finger print reader and storage for reading and storing biometric data of employees having access to the cash registers of the check out stations in the system. Authorization to use a cash register in the system is programmed into the microprocessor in the system, limiting use of a cash register to authorized employees. Employees are identified by finger print using biometric technology. Limitations of use is extended to access to operate particular cash register(s); handling returned merchandise at a cash register; refunds on returned purchases require authorization of the manager and the cashier; cashing checks at a cash register, where the limitation includes only cashing of employer drawn payroll checks of employees; and, clearing errors made in tabulations at a cash register. Unauthorized persons attempting to gain access to cash registers to which they are not authorized serves to activate an alarm.

11 Claims, 8 Drawing Sheets

BIOMETRIC IDENTIFICATION AND SECURITY SYSTEM ASSOCIATED WITH CASH REGISTER

BACKGROUND OF THE INVENTION

1. Field of the Invention

The present invention relates to security and access control systems and apparatus for check out stations and cash registers used in commerce at the wholesale and retail level.

2. Prior Art

The check out stations which include cash registers of wholesale and retail commercial establishments that are open, to essentially, the public are multi-function stations. The cash register normally included as a part of the check out station is often a complex, multi-function, intelligent machine. The machine is basically a cash register with an alphanumeric key board through which data is entered into the machine. Transactions are calculated and displayed to both the operator and the customer. The machine handles multiple transactions. The type of transaction could be a wholesale or a retail sale, for example. Taxes on the sale are accordingly calculated. The transaction could be a cash, a check, a credit card, a debit card or a line of credit sale, for example, either wholesale or retail. The transaction could be a sale or a return of merchandise purchased for cash return or credit return or exchange of merchandise in kind or some other kind. These and other commercial transactions are handled at multi-function commercial check out stations along with inventory update and record keeping and check cashing. An example of a currently manufactured electronic, multi-function cash register is the ROYAL model 9170 Cash Management System available from Staples, Inc. of Framingham, Mass. This multi-function cash register does automatic tax computation, prints out written receipt identifying the purchase made and price charged, has a dual alphanumeric display with programmable store logo, maintains a two-station alphanumeric journal and has a locking cash draw.

Whether the commercial establishment has a multi-station check out system or a single station check out system, most check out stations have a locking feature which effectively limits access to the multi-functions of the check out stations. The locking feature may be over come by use of the proper key inserted into a lock tumbler in the cash register or may be a code or pin number punched into a key board. But the problem of these key devices is security. Keys, pin numbers, pass words or other codes may be readily stolen and used by unauthorized persons. Further, because the check out station has a great plurality of functions, some of the functions of the system may be unauthorized to certain persons, who have authorized, but limited use of the multi-function machine, use limited to certain specific functions of the machine. Some persons may not have the training or ability to use all the functions of a multi-function machine. On the other hand, some persons may intentionally use unauthorized functions of the machine for dishonest purposes. Other persons may have full authorized use of the machine. The U.S. Pat. No. 5,615,277; issued to Hoffman, teaches a tokenless security system and method for authorizing access to a computer system. Personal identification, using unique biometric sample comparison, integrated into a computer security system is taught. Comparison provides authentication of an individual entitled to access to the computer system. A second coded input by the authorized person indicates whether the act of access is voluntary on the part of the authorized person or if the authorized person is being forced by another person to request access. In the case of voluntary access, unlimited access to the computer is provided. In the case of coerced access, limited access to the computer is provided. Hoffman requires that the individual first be identified as an authorized person or user and then that the authorized user inform the security system whether the access by the user is a voluntary act on the user's part or the user is being coerced or forced by a third part to request access to the computer.

Identification and/or verification of identity using biometric comparison techniques is well known. A few examples of U.S. patents that teach techniques and/or apparatus for biometric comparison for identification and/or personal verification are:

| | | | |
|---|---|---|---|
| U.S. Pat. No. 3,576,583 | issued to Miller | April 1971 | ('583) |
| U.S. Pat. No. 4,690,554 | issued to Froelich | September 1987 | ('554) |
| U.S. Pat. No. 5,073,949 | issued to Takeda et al | December 1991 | ('949) |
| U.S. Pat. No. 5,815,252 | issued to Price-Francis | September 1998 | ('252) |
| U.S. Pat. No. 6,002,785 | issued to Ucida | December 1999 | ('785) |
| U.S. Pat. No. 6,028,950 | issued to Merjanian | February 2000 | ('950) |
| U.S. Pat. No. 6,148,094 | issued to Kinsella | November 2000 | ('094) |
| U.S. Pat. No. US6,185,318 B1 | issued to Jain et al | February 2001 | ('318) |
| U.S. Pat. No. US6,208,264 B1 | issued to Bradney | March 2001 | ('264) |
| U.S. Pat. No. US6,219,439 B1 | issued to Burger | April 2001 | ('439) |
| U.S. Pat. No. US6,241,288 B1 | issued to Bergenek et al | June 2001 | ('288) |

Miller, in his '383 patent teaches a personal identification biometric comparison system, compares selected features of the contour or outer dimensions of the fingers of an individual with previous data on identical body parts. Froelich, in his '554 patent teaches a device for comparing a real time finger print image with finger print images already on file. The apparatus includes a pair of self-correcting relay lens systems arranged symmetrically about a common image plane. The '949 patent to Takeda et al teaches a personal verification apparatus that identifies or verifies an individual by the proportional relationship of the joints of the fingers by comparing previously taken and filed data with current data of the same body parts of the same person. The '252 patent to Price-Francis teaches an apparatus and system for verifying that a card held or possessed by a person is owned by that person. One or more of the card owner's finger prints are encoded on the card. The person possessing the card provides his or her finger prints and the encoded finger prints and the prints provided by the person are compared to establish verification. The Ucida '785 patent teaches apparatus for comparing finger print pattern level feature differences for reducing the volume of file data prints for further checking. The Merjanian '950 patent teaches a method and apparatus for guiding a finger of a person on to a platen for reading the finger print on the finger. In one aspect of the invention Merjanian teaches a housing supporting at least two planar surfaces, one of which supports the finger for reading the finger print, the other of which provides a griping surface for holding the housing. In another aspect the housing supports a contoured surface with a guide for guiding a person's finger on to the platen of the reader. Kinsella in the '094 patent teaches a biometric sensor integrated into a computer mouse, the sensor being operated in response to grasping the computer mouse. The biometric sensor system includes a sensor/comparator that senses a selected personal characteristic of the person grasping the computer mouse and compares the personal characteristic with previously obtained and stored personal data of a person. A successful comparison between the real time data and the stored data indicates verification of the user. Continued monitoring of the computer mouse ensures that the same person, previously verified is using the computer mouse. The '318 patent issued to Jain et al teaches a system and method for matching finger print patterns by creating a one dimensional representation of one or more points in a finger print pattern. The one dimensional representations are created by finding corresponding reference points in finger print pattern and generating an index of points which represents the finger print pattern. Indexes of two finger print patterns are compared for matching purposes. This is another way of matching finger print patterns. Bradney et al in patent '264 teaches a personal verification system using the thumb print of a person being interrogated. The thumb print of a person is converted into a coded data and the data is stored on a card. The teaching provides a reader which reads the coded data on the card and reads the thumb print of a person. The card is inserted in the reader and the reader scans the print on the thumb of a person. The reader reads the data on the card and, at the same time, converts the scanned thumb print into a corresponding code. Comparison of the stored, coded data on the card and the real time code data from the scanned reading, identifies that the person whose thumb print is scanned as the person who owns the card. The '439 patent to Burger teaches a biometric authentication system which includes a dual data input reader which reads both stored data and real time data. The stored data consists of physiological data, such as finger print pattern data of a person, stored on a chip disposed in a card. The real time data is data representing a finger print scan of a person, by the reader. The physiological data stored on the chip in the card is compared with a real time finger print scan for verification and identification. Physiological data includes finger print pattern, retina scan, voice sound wave pattern, saliva and other physiological data. Bergenek et al in the '288 patent teaches a finger print identification/verification system using comparison of bit maps generated from a finger print pattern. Geometric configurations in a finger print pattern are recognized and a reference between geometric configurations in the same finger print pattern are mapped out in a bit map. Stored bit maps of finger print patterns are compared with a bit map generated from an input finger print pattern of a person. Identification or verification of a person is made by comparing two bit maps of finger prints.

The above discussed prior art establishes a data base of information on identification and verification of persons by comparing finger print pattern data and other biometric data. However, this prior art does not address the problems that the present invention is designed to solve. The present invention addresses the problem of unauthorized and authorized use of a multi-function wholesale and/or retail commercial establishment check out system and deterring theft from the check out system. It should be apparent to one skilled in the art that the discussed prior art is to be construed within the limitations established by the inventors named in the respective patents and in the claims defining the inventions.

OBJECTS OF THE INVENTION

It is an object of the present invention to provide a wholesale/retail check out system which promotes employee honesty and provides a reliable inventory index and cash flow.

It is a further object of the invention to provide a biometric technology system for control of the access to the functions of a multi-function cash register at a check, out station in a commercial establishment.

It is also an object of the invention to provide a controlled cash register which deters employee theft in a check out station where an employee uses unauthorized functions of a multi-function cash register.

Another object of the invention is to provide a biometric technology security system for a commercial check out system that controls access to the cash register.

These and other objects will become apparent when reading the following detailed description of the invention with reference to the drawings.

SUMMARY OF THE INVENTION

The present invention provides a commercial establishment check out system which includes one or more check out stations or counters, each of which includes a cash register means. One or more of the cash registers in a multi-station check out system may be a multi-function cash register means and each multi-function cash register means includes a biometric human digit print identifier, such as a thumb print or finger print reader and identifier or comparator for keying or permitting a selected, identified person either limited access or unlimited access to the cash register functions of the check out station. Each cash register means includes at least a cash draw which is both lockable and unlockable, at the local level and which may have central control override; a bar code scanner/reader means for identifying merchandise passed through the check out station; a reader means for reading checks and/or cards, such as credit cards and/or debit cards presented for payment of merchandise; a biometric reader means for reading human physiological information or data, with a data sending means for sending human physiological data read to a comparator for comparison purposes and a locking control means for locking the cash register and/or the cash draw in response to selected signals and for unlocking and permitting access to all or selected functions of the multi-function cash register.

From another aspect, the invention provides a single station or multi-station check out system, for a commercial establishment, in which one or more check out stations or check out counters of the system are connected to a central control station which override control over the individual check out stations in the system. In accordance with the invention, each check out station includes a cash register means having multi-function capabilities. Some cash registers in a multi-station system may have more capabilities than other cash registers in the same system. An example of some of the capabilities that may be included in a cash register are a cash draw that is capable of being locked and unlocked, both manually and automatically; visual and hard copy readout of transaction data; full mathematic capabilities; automatic tax calculation; bar code recognition of merchandise passed through the check out station; check, credit and debit card reading; biometric reading means with physiological data comparison; storage for physiological data for use in data comparison; electronic transfer of funds associated with the check reading capability; communication with the central control station; communication with a clock means; and activation of an alarm means.

In practicing the invention, some multi-station check out systems, with central control station may include some cash registers that have full multi-function capability and other cash registers that have multi-function capability, but selected functions of a full multi-function capability cash register have been deleted, cancelled out or omitted from the cash register. In a preferred, multi-station check out system with a central control station, the cash register in each respective check out station has full multi-function capability and may include more capabilities than mentioned above.

The cashier that operates the cash register in a check out station is usually responsible for the proceeds in the cash draw. The proceeds could be cash, checks, credit slips, debit slips, coupons, food stamps, and the like. The cashier is usually very careful that the account in the cash draw balances at the end of the work shift or work day. However it is not unknown for a manager to take advantage of a cashier's absence, such as taking a short break, and pilfer cash from the cash draw of an unattended cash register. It is an objective of the invention to prevent such theft by preventing operation of the cash register by any one unauthorized to operate the cash register and to monitor what authorized person is using the cash register during any time period. One of the features of the present invention includes the monitoring of the use of each cash register in the system. When a cash register in the system has been activated or turned ON for operation, and, if during the ON period the cash register is not operated and/or used for a predetermined period of time, such as ten (10) seconds, for example, the cash register is shut down, becoming locked and a person authorized to use the particular cash register must insert a proper finger into a biometric reading means, such as a finger print reader means, for example, in order to unlock the cash register and/or restart the cash register, for further use. This will prevent unauthorized persons from using the cash register while the authorized cashier is away from the check out station. In accordance with the invention, the finger print of an unauthorized person will not unlock or start the cash register.

Similarly, the employer may make provision for his employees to cash employee pay check at the cash register, without the employee's finger print. Thus, one or more of the cash registers in the system may include a check recognition capability, which recognizes an employee payroll check and permits selective cashing of checks. This will ensure that checks, with insufficient funds in the bank to cover the amount of the check are not cashed through the cash register. This also prevents fraud on the part of the cashier who could otherwise cash checks in amounts that are insufficiently covered by funds in the bank. The U.S. Pat. No. 6,243,689 B1, issued to Norton, January 2001 teaches a check reading and electronic fund transfer system for paying funds identified in a check drawn by the payer to the payee. The check is a conventional two part draft instrument with bar code readable identification. The original portion of the instrument authorizes transfer of fund to the payee. Check cashing within the definition of the present invention may be done by exchanging the check for an amount of cash represented by the check or may be accomplished electronically into a bank.

A comprehensive audit trail of individual financial transactions of each cash register is accumulated and stored in the respective cash register. In accordance with the invention, in check out systems which include a central control station audit trail data and/or inventory transfer information are forwarded to a retrievable storage in the central control station. The synergistic combination of the cash register receipts data, merchandise recognition and employee finger print identification scanning techniques provide beneficial effects that are not possible with any other type of cash registers and/or biometric identification devices.

DETAILED DESCRIPTION OF THE INVENTION

Figure 1:
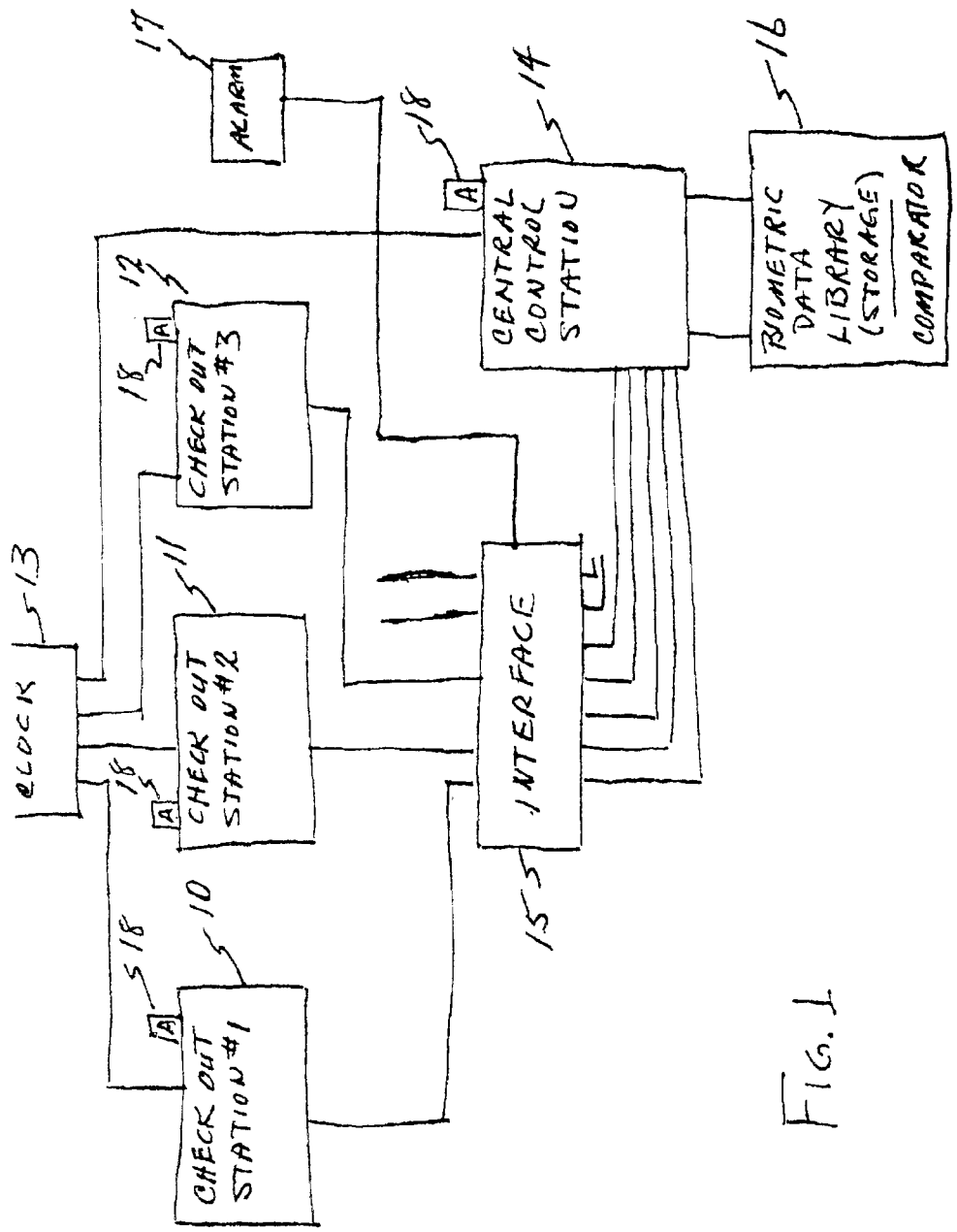
FIG. 1 is a block diagram representing one embodiment of the invention.

A preferred embodiment of the invention is represented in block diagram form in FIG. 1 as a check out system with a plurality of check out stations and a central control station. Three (3) check out stations, block 10, Check Out Station #1; block 11, Check Out Station #2 and block 12, Check Out Station #3 are represented, although more or fewer than three (3) check out stations may be used in one check out system, if desired. The Check Out Stations 10, 11 and 12 and the Central Control Station, block 14 are each connected to a real time clock, Clock, block 13 which keeps a running tally of commercial functions performed by the system with identification of employees using the functions, on a date, day and time of day basis. Each check out station is connected to an Interface, block 15 which connects to the central control station, block 14. The Central Control Station, block 14 includes a Biometric Data Library (Storage) and Comparator represented by block 16. An Alarm, block 17 is connected through the interface, block 15 to each check out station and to the central control station. The Alarm may be an audible alarm and/or a visible alarm and may be connected to a security monitoring system and/or to the local police, if desired.

In a single station check out system an Interface and a Central Control Station may be eliminated and the storage and comparator may be associated with the cash register in the system or with the Clock, to which the cash register is connected. An example of a cash register that may be used when practicing the present invention is the ROYAL model 9170 Cash Management System, marketed by Staples, Inc. of Framingham, Mass. The cash register includes a cash draw that may be locked and unlocked; a monitor for visual display of a transaction; a printer and tape supply for providing a hard copy of the transaction; an alphanumeric key board, linked to the microprocessor. The microprocessor is programmable to automatically calculate taxes on transactions, and to receive and respond to instructions and/or commands. Some instructions and/or commands which may be programmed into the microprocessor include limiting access and/or use of the cash register and/or functions of the cash register to certain employees who have been identified by identification means in the system. Instructions programmed into the system may include, without limitation:

a) permitting access to the cash register to properly identified persons, such as an employee assigned to the cash register and identified by biometric comparison;

b) limiting the type of checks cashed to pay roll checks drawn by the employer/owner of the establishment;

c) monitoring use of a cash register and shutting down the cash register a predetermined period of non-use; and, d) limit use of the cash register to persons properly identified for certain defined transactions or functions on the cash register, such as cashing checks, making refunds, making exchanges and/or voiding a tabulation made on the cash register.

In addition to the hard wire communication system represented in FIG. 1, additional forms of communication, such as an air link and/or a visual link, may be used in the check out system. A second communication system is represented by the A in blocks, 18 at each check out station and at the central control station.

Figure 2:
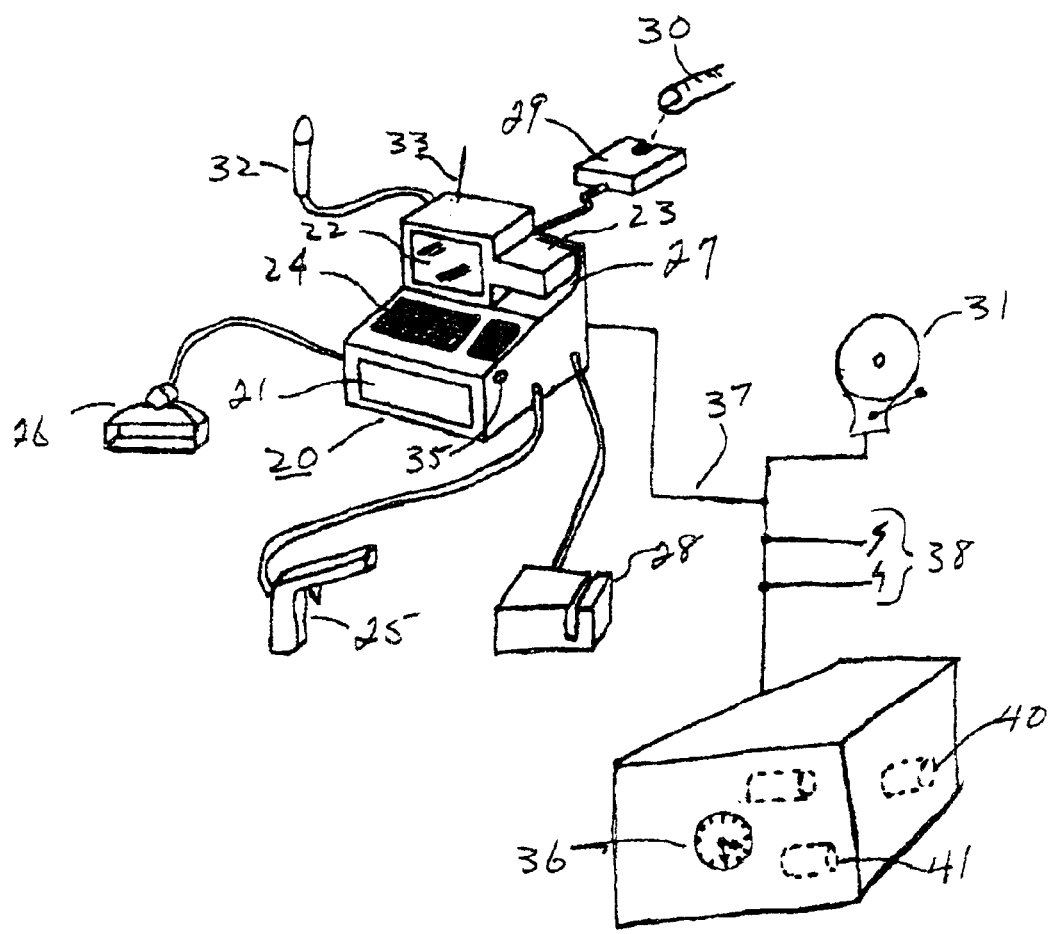
FIG. 2 is a representation of a check out station, with central clock.

FIG. 2 represents a cash register 20, which is microprocessor controlled and includes a cash draw 21, for storing cash, checks, credit and debit slips, etc., the cash draw being both lockable and unlockable, a visual output or monitor means 22 for displaying transactions, a printer means and tape storage means 23 for printing hard copies of transactions, an alphanumeric key board 24 for inputting data into the cash register, an hand held bar code reader means 25, for reading standard bar codes which identify and item and provide the price of the item, for example, a stationary bar code reader means 26, which also reads standard bar code but is usually mounted in the counter of the check out station, a check reader means 27 which reads check identification, a card reader means 28 which reads credit and/or debit cards, a finger print reader means 29, for reading biometric data when a finger, 30 is placed on the platen of the finger print reader means. The cash register may also include a transmitter/receiver (not shown) connected to a microphone 32 and an antenna 33 for communication with the office or another station, for example. A panic alarm button 35 is represented for emergency operation of the alarm 31 which may be audible and/or visual. The alarm may connect to an alarm monitoring system and/or to the police, if desired. The cash register 20 is connected to a clock 36 which provides digitized time data, such as year, date, day of the week and time of day to the cash register via communication lines 37. The uncompleted lines 38 represent connections to other cash registers in other check out stations that may be in the same system. The broken line box 40 represents a storage means for finger print data and the broken line box 41 represents a comparator for comparing stored finger print data with current finger print data read by the print reader 29. One type of print reader is describe in U.S. Pat. No. 6,241,288 B1 issued to Bergenek, et al which converts the pattern of a thumb print into a digital bit map. This patent is discussed above.

The Clock 36 keeps a running tally of the year, date, day and time of day and converts the time data into a readable digital code, readable by the cash register. The Clock is either reset manually periodically or reset automatically via Internet as a calibrated code from NIST or an equivalent national agency. The business computer may serve as a master clock that synchronizes real time clocks of each of the check out stations, if desired.

Figure 3:
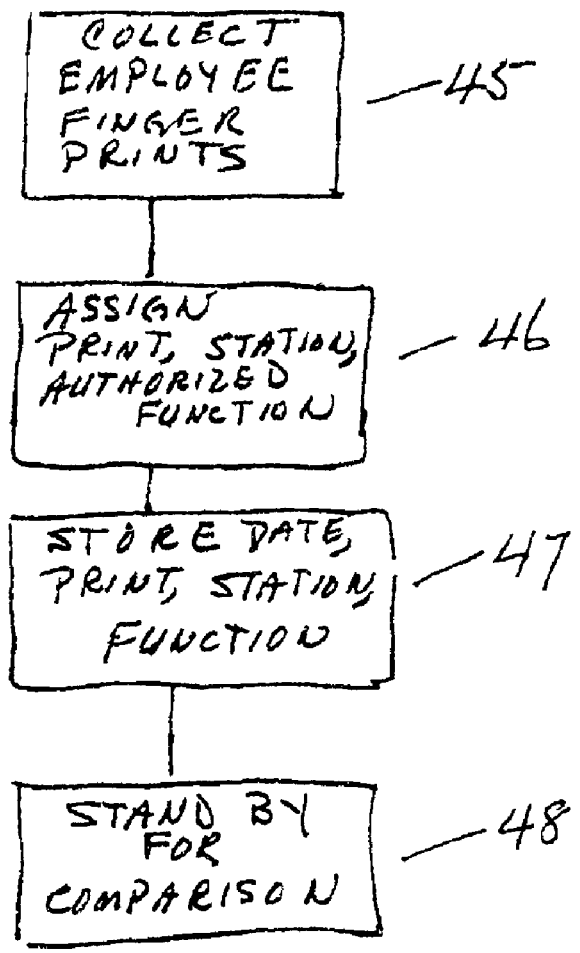
FIG. 3 is a flow chart for accumulating employee data for matching employees with authorized stations and function at such station.
Figure 3A:
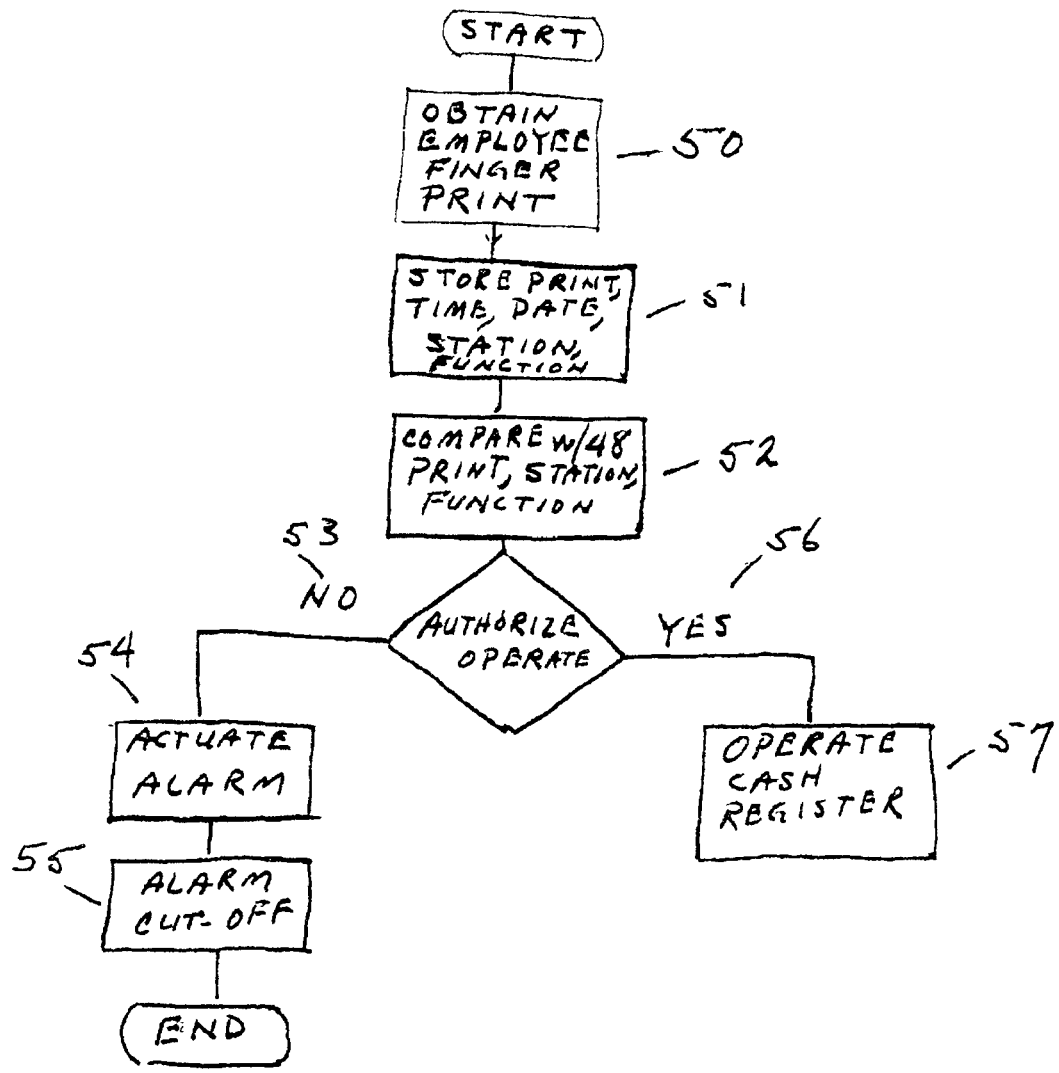
FIG. 3a is a flow chart for cashier identification and authorized position.

Referring to FIG. 3, a flow chart represents a sequence of steps or operations for generating a library or storage of employee identification data, location of work or station data and authorized work functions data, for each employee. The identity of each employee is stored in a readable memory. Finger print data from each employee's hand is read and stored 45. The employee, identified by the particular print, is assigned a station and authorized work functions 46. The print data, identifying an employee, the date the print data was taken, the station at which the employee is assigned to work and the authorized work functions of the employee associated with the particular print data are stored 47 and held in standby for comparison purposes 48. FIG. 3a is a flow chart representing a sequence of operations for activating a cash register. The sequence is initiated by a person inserting a finger in the finger print reader means 29, of FIG. 2, so that the finger print pattern may be read. Here it is assumed that an employee starts a day at the check out station. The employee inserts a finger in the finger print reader means and the finger print is read by the print reader 50. The data of that, current finger print is stored with time, date and station 51. The current print data is compared with the library of prints held in standby 48, FIG. 3, for determining if the print is a match with a print in stand-by storage for comparison 48, for the person authorized to use the cash register at this station 52. If there is a match, authorization to operate is YES, 56, the cash register is activated 57. If the prints read by the print reader do not match, NO, 53, the alarm is actuated 54, calling the attention of the Security operation in the establishment. In a preferred embodiment of the system, the alarm is manually deactivated, ending the sequence. This protects use of the cash register from unauthorized persons.

Figure 4:
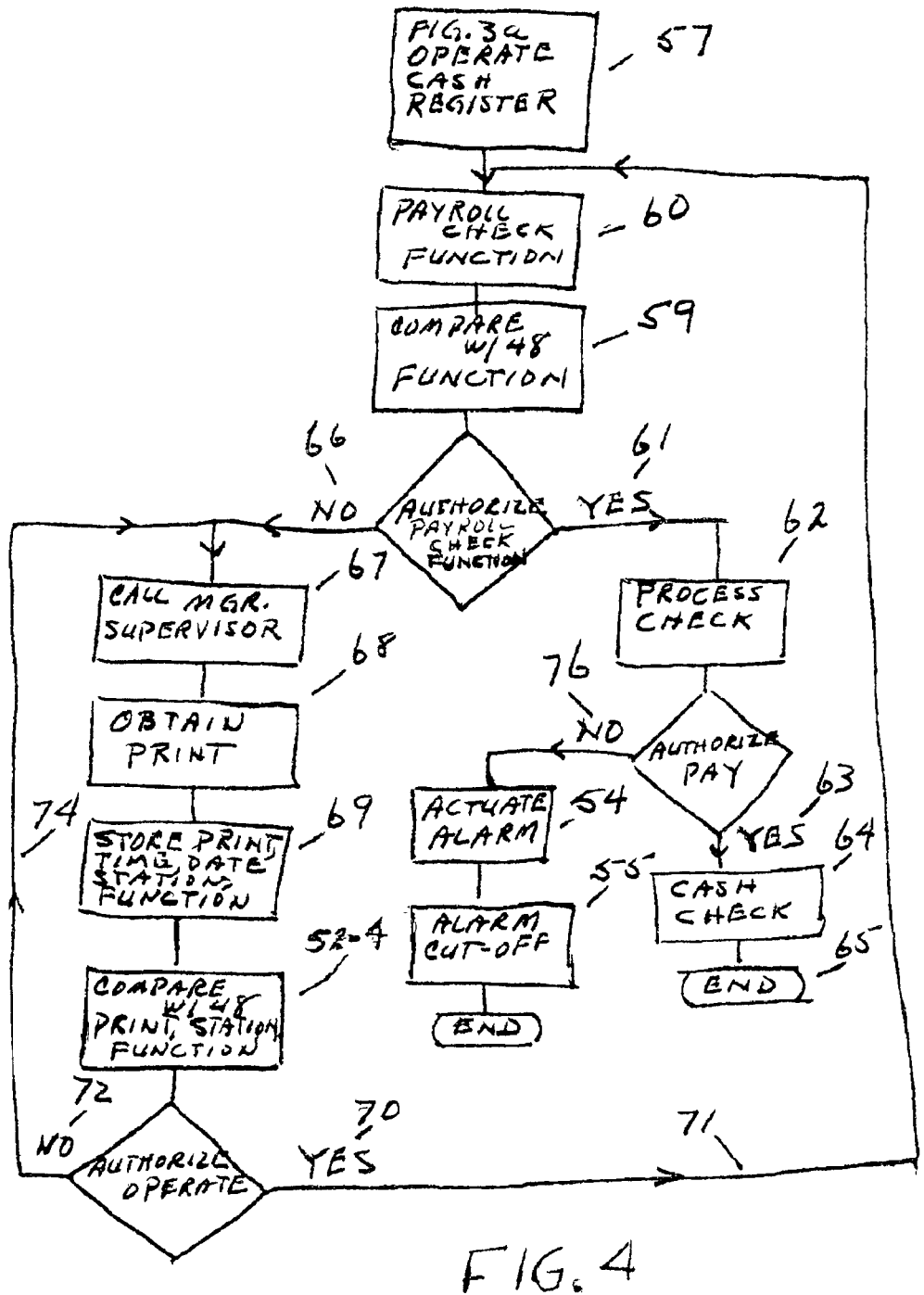
FIG. 4 is a flow chart for protecting the payroll check cashing function.

FIG. 4 is a flow chart representing a sequence of steps which prevent the cashing of unauthorized checks. In a preferred embodiment of the invention, only payroll checks drawn by the employer-owner are authorized cashed at the system cash register.. The prevents the cashing of checks that are not covered by adequate finds in the bank. The sequence represented in FIG. 4 starts with the cash register in operation 57, in FIG. 3a. The cashier enters the function, for example, Cash Employee Payroll Check 60. The finger print of the cashier is already on file for this work period. The print, station and function are compared with the data in stand-by comparison 48 at 59. If a match authorizes the function YES, 61 the payroll check is processed 62 for pay authorization. If YES, 63 the check is cashed 64 and the sequence ends 65. If the function authorization is refused NO, 66, the cashier calls a manager or supervisor 67. The finger print of the manager or supervisor is obtained 68 and the print is stored with time, station and date 69. Current print data is compared with stored stand-by data for print, station and function 52-4. If the function is authorized YES, 70, the authorized manager/supervisor follows the process through line 71 via block 60. If authorization is NO, 72, the manager/supervisor calls a higher level manager as indicated by the line 74. This process ensures that payroll checks of employees of the establishment are cashed and that an identified, authorized person preforms the function of cashing the check.

Figure 5:
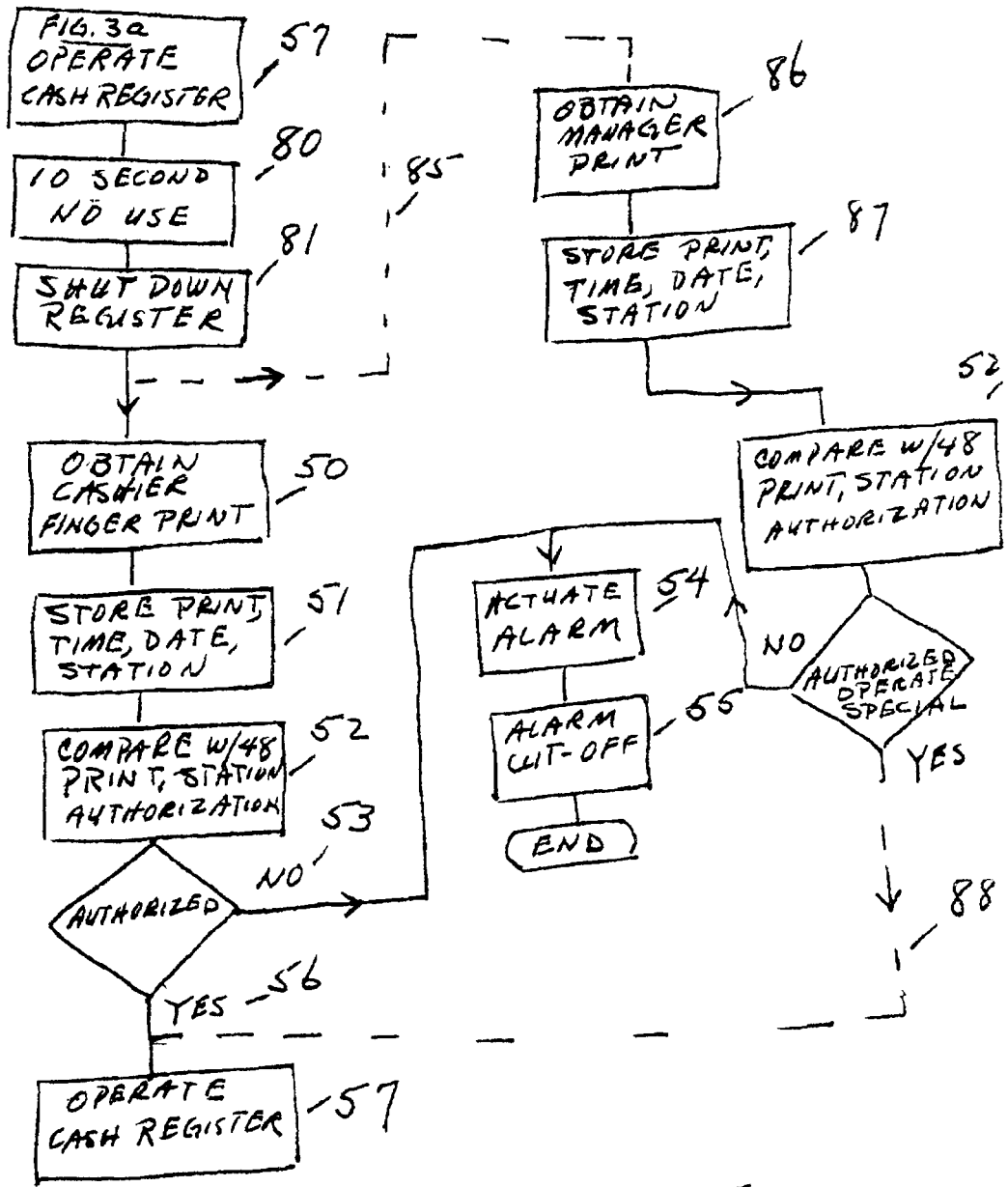
FIG. 5 is a flow chart for non-use protection of a cash register with unauthorized user protection.

The flow chart in FIG. 5 represents a process for protecting the cash register of a cashier who may leave the cash register unattended for a few moments of time or takes a break from the check out station, without shutting down the cash register. The process represented would occur at a time after the cash register has been activated, such as at 57 in FIG. 3a. To set up such a process the cash register would be programmed to monitor itself and to shut itself off if the cash register is activated but is not used or operated for a predetermined period of time, such as ten (10) seconds 80 and 81. In order to reactivate the cash register the cashier must go through the same process as represented in FIG. 3a, that is, 50, 51, 52, 56 and 57. If a third person were to attempt to activate the cash register after shut down 81, but before the cashier has returned to the station, it is preferred that any third person be denied access to the cash register. This will prevent theft from the cash draw. On the other hand, it may, under special circumstance, be necessary for a manager or a higher level supervisor to obtain access to the cash register, as the cashier may have become ill, for example. The broken line 85 represents the attempt of a third person to obtain access to the shut down cash register. The finger print of a third person or the manager is obtained 86 and the print, time, date and station are stored 87. Comparison is made with stored stand-by data 52-5. In the preferred system, authorization would not be granted, without special override, for example. However, if authorization is YES, the manager/supervisor gains access vis 88 to operate the cash register 57. This sequence prevents theft by managers, supervisors and/or higher level employees from the cash draw of a cash register left open by a cashier who has left the check out station for some reason, without shutting down the cash register.

Figure 6:
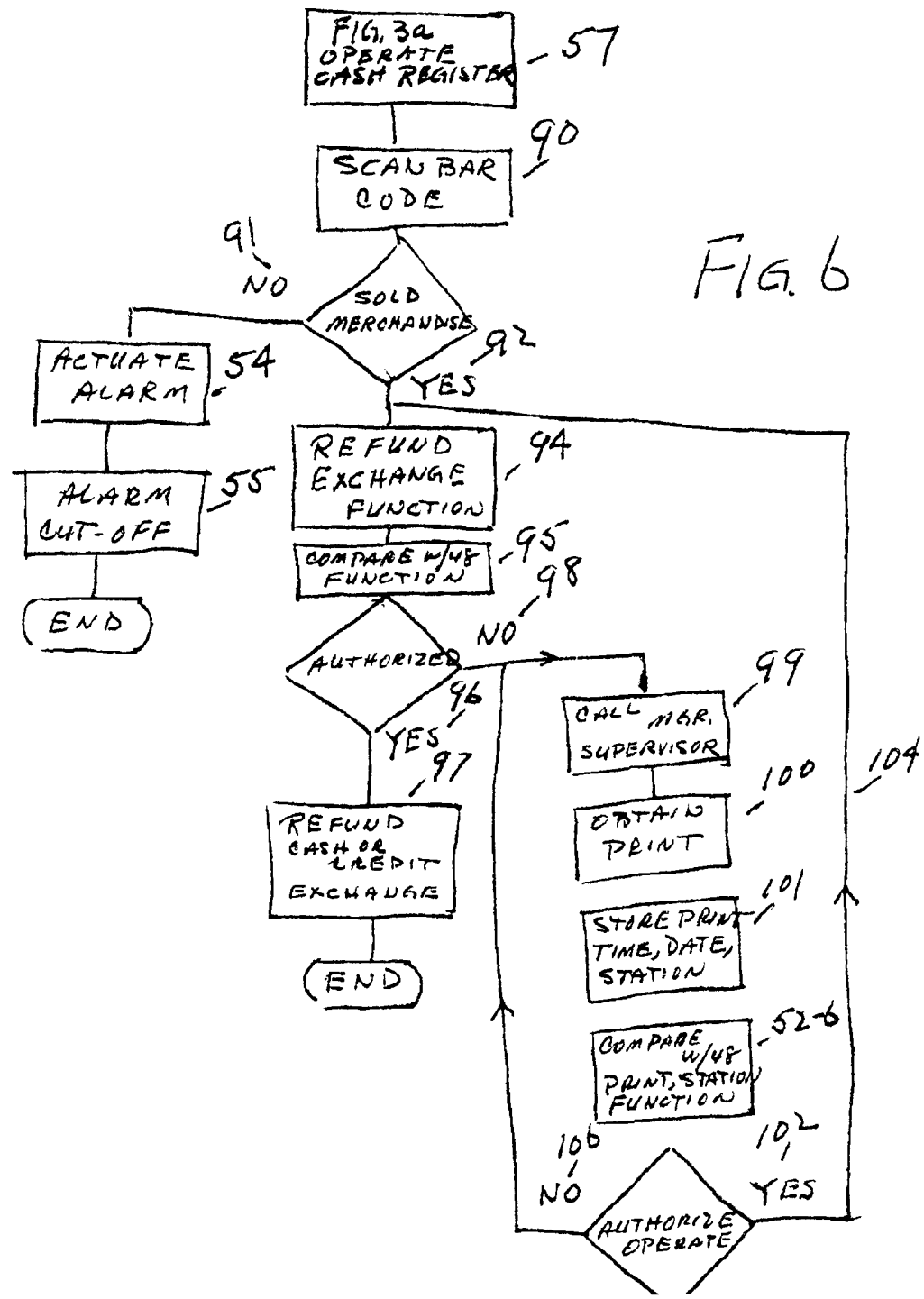
FIG. 6 is a flow chart for protecting other than normal commercial functions and use of a cash register.

FIG. 6 is a flow chart that represents a sequence of steps for the bar code scanning of merchandise returned to the establishment and the prevention of theft by unauthorized refund payments or exchanges of goods purchased elsewhere. The cash register is in operation as at 57 in FIG. 3a. Merchandise is presented for scanning the bar code 90. This determines if the merchandise was purchased at the current establishment or elsewhere. If the merchandise was purchased at the current establishment the response is YES, 92. The function of Refund or Exchange 94 is entered and this work function is compared with the authorized work functions of the cashier 95. The cashier's finger print is already filed for this work period. If the cashier is authorized YES, 96 the refund of cash, credit or exchange 97, is made. If authorization is NO, 98 a supervisor or manager is called 99. The finger print of the called employee is obtained 100 and the print, time, date and station 101 is stored. Comparison with stand-by data 48, is made, 52-6 to determine if the called person has authority to operate the cash register at this station. If authorization to operate is YES, 102 the step goes to determine if the called employee also has authorization to handle refunds and/or exchanges 94 via line 104. If authorization is NO, 106 an employee of higher level is called so that an authorized employee is obtained to operate the cash register and handle the refund or exchange function. If the merchandise was purchased at some other establishment, the response NO, 91 would activate the alarm. This sequence of steps ensures that refunds and/or exchanges are made for only merchandise purchased at the current establishment and that the actual refund and/or exchange made is made by an authorized employee.

Figure 7:
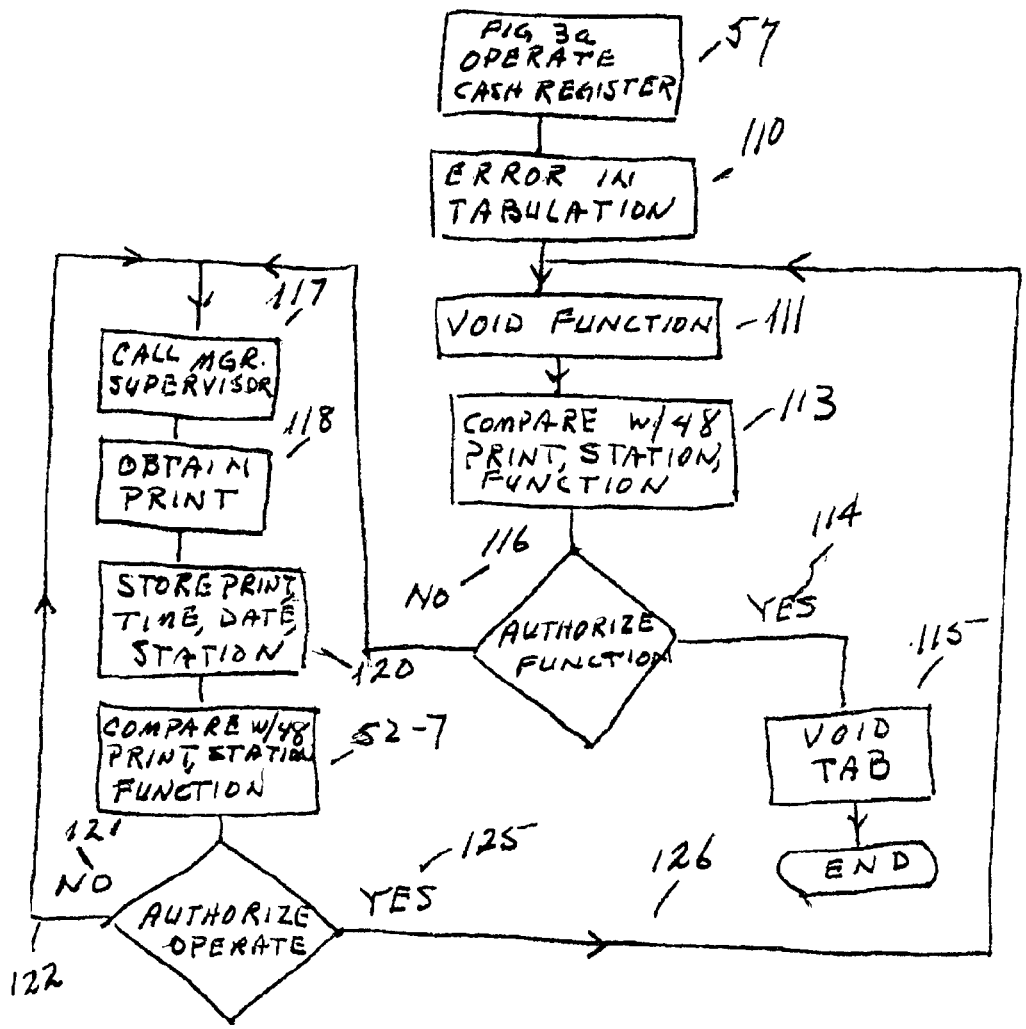
FIG. 7 is a flow chart for authorizing the voiding of a tabulation on the cash register.

FIG. 7 is a flow diagram that represents a sequence of steps or operations for voiding a tabulation on a cash register that includes an error in the tabulation. The cash register is in operation as in FIG. 3a at 57. An error in the tabulation occurs. The cash register must be put through Void Function 111. This Function is compared with data in stand-by 48 with the print of the cashier already on file for the current work period 113. If the cashier is authorized to preform this function the response is YES, 114. The cashier will void the tabulation 115. If the cashier is not authorized to preform the function, the response is NO, 116. A call is made to a manager or supervisor 117 from who a finger print is obtained 118. The print is stored with the time, date and station 120 for comparison with stand-by data 48 at 52-7, for authorization to operate the cash register at this station. If NO, 121, a higher level employee 117, is called via line 122. The higher level employee goes through the steps 118, 120 and 52-7 for authorization to operate. With a YES 125 response the Void Function is identified 111 and the print of the higher level, authorized employee is compared with stand-by data 48 for authorization of the function 113. With a YES, 114 the higher level employee performs Void Tab 115. This sequence ensures that errors in the tabulation at a cash register will be cleared only by authorized employees.

The present invention discloses a check out system and station that provides a higher level of security than that taught by the prior aft. The use of biometric technology for ensuring identification and verification of employees with authorization addresses the problem differently than taught or suggested in the prior art. All employees are identified with the use of biometric technology with identification data and authority stored for comparison with newly entered data providing security. The proper cashier at the assigned cash register is assured. The cashing of checks is limited to employer drawn payroll checks and those checks are cashed only by authorized employees. The security of a cashier's cash draw is assured. Refunds and/or exchanges of merchandise are limited to establishment purchased goods and refunds and exchanges are made by authorized employees. Preferably, refunds require authorization from the manager and the cashier. Clearing a tabulation error on the cash register requires a supervisor authorization.

In the foregoing description of the invention, referenced to the drawings, certain terms have been used for conciseness, clarity and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented or described.

Having now described a preferred embodiment of the invention, in terms of features, discoveries and principles, along with certain alternative construction and suggested changes, other changes may become apparent to those skilled in the art may be made, without departing from the scope of the invention defined in the appended claims.

What is claimed is:

1. A commercial check out station system comprising:
   a) a cash register means;
   b) a biometric reader means for reading and storing a biometric data read by said biometric reader means; and,
   c) a comparator means associated with said cash register means for comparing said stored biometric data with a second biometric data read by said biometric reader means for identifying only those persons authorized to have access to said cash register means.

2. A commercial check out station system as in claim 1 wherein said cash register of said check out station system will automatically shut down if said cash register is not used for a predetermined time interval.

3. A commercial check out station system as in claim 1 wherein checks cashed through said cash register means are limited to employee payroll checks drafted by an employer/operator of said commercial check out station system.

4. A commercial check out station system as in claim 1 wherein said biometric reader means is a thumb print reader means.

5. A commercial check out station system as in claim 1 wherein said biometric reader means is a finger print reader means.

6. A commercial check out station system as in claim 1 which further includes a real time clock for providing a running tally of date, day of week, time of day and year.

7. A commercial check out station system as in claim 6 where in said cash register means is a plurality of cash register means.

8. A commercial check out station system as in claim 7 each said cash register means of said plurality of cash register means includes
   a) a check reader means for reading a data on a check identifying an account on which said check is drawn and a bank which holds said account.

9. A commercial check out station system as in claim 8 which further includes
   a) a standard card reader means for reading a credit card and a debit card; and
   b) a bar code reader means for reading data encoded in bar form code.

10. A commercial check out station system as in claim 7 and said system further includes
    a) a central control station, coupled to each said cash register by a hard wire link and by a wireless link for communication between stations.

11. A commercial check out station system comprising:
    a) a cash register means;
    b) means to automatically shut down said cash register means if said cash register is not used for a predetermined time interval;
    c) means to limit checks cashed through said cash register means to employee payroll checks drafted by an employer/operator of said commercial check out station system;
    d) a biometric reader means for reading and storing a biometric data read by said biometric reader means; and,
    e) a comparator means associated with said cash register means for comparing said stored biometric data with a second biometric data read by said biometric reader means for identifying only those persons authorized to access said cash register means.

* * * * *